United States Patent [19]

Stones et al.

[11] Patent Number: 5,636,367

[45] Date of Patent: Jun. 3, 1997

[54] N+0.5 WAIT STATE PROGRAMMABLE DRAM CONTROLLER

[75] Inventors: Mitchell A. Stones, Phoenix; Jeffery M. Michelsen, Mesa, both of Ariz.

[73] Assignee: VLSI Technology, Inc., San Jose, Calif.

[21] Appl. No.: 661,739

[22] Filed: Feb. 27, 1991

[51] Int. Cl.$^6$ .................................................. G06F 13/16
[52] U.S. Cl. ................................ 395/494; 395/878
[58] Field of Search ........................... 365/233, 189.01, 365/193; 395/425, 550; 364/DIG. 1 MS File

[56] References Cited

U.S. PATENT DOCUMENTS

| | | | |
|---|---|---|---|
| 4,575,794 | 3/1986 | Veneski et al. | 395/775 |
| 4,797,850 | 1/1989 | Amitai | 395/433 |
| 5,032,982 | 7/1991 | Dalrymple et al. | 395/550 |
| 5,033,027 | 7/1991 | Amin | 365/222 |
| 5,047,924 | 9/1991 | Fujioka et al. | 395/550 |
| 5,077,686 | 12/1991 | Rubenstein | 395/550 |
| 5,086,387 | 2/1992 | Arroyo et al. | 395/550 |
| 5,097,437 | 3/1992 | Larson | 395/775 |
| 5,167,031 | 11/1992 | Watanabe | 395/550 |
| 5,179,713 | 1/1993 | Catlin et al. | 395/800 |

*Primary Examiner*—Tod R. Swann
*Assistant Examiner*—J. Peikari
*Attorney, Agent, or Firm*—Richard R. Mybeck

[57] ABSTRACT

CPU system performance is improved by reducing the time required to complete a DRAM access by microprocessors such as the 386DX, 386SX and 80286 by incorporating a programmable DRAM controller therewith which permits consecutive DRAM accesses to average N+0.5 processor wait states. The half wait state average is obtained by forcing the system CPU to measure wait states in processor clock time units which are twice the period of an independent clock in the DRAM controller which, in turn, triggers RAS and CAS assert and de-assert. RAS or CAS is thus able to assert ½ processor clock period earlier in one memory cycle relative to the last. Early assert time also provides for an early de-assert time so that data can be transferred to/from the DRAM more quickly than previously possible.

7 Claims, 4 Drawing Sheets

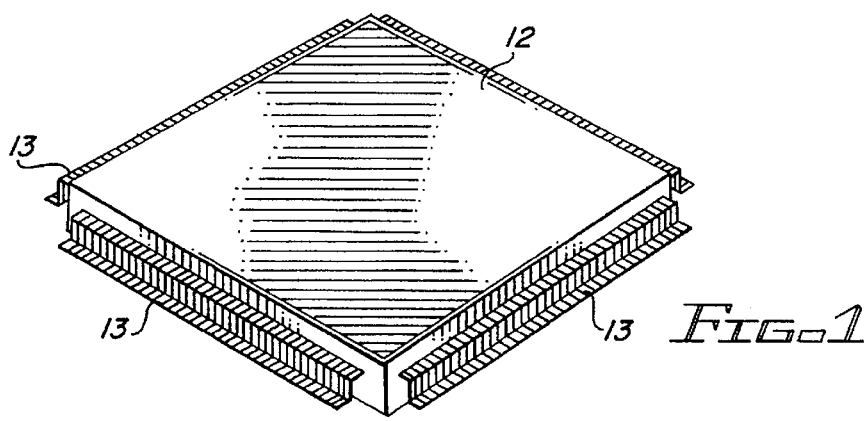
FIG. 1
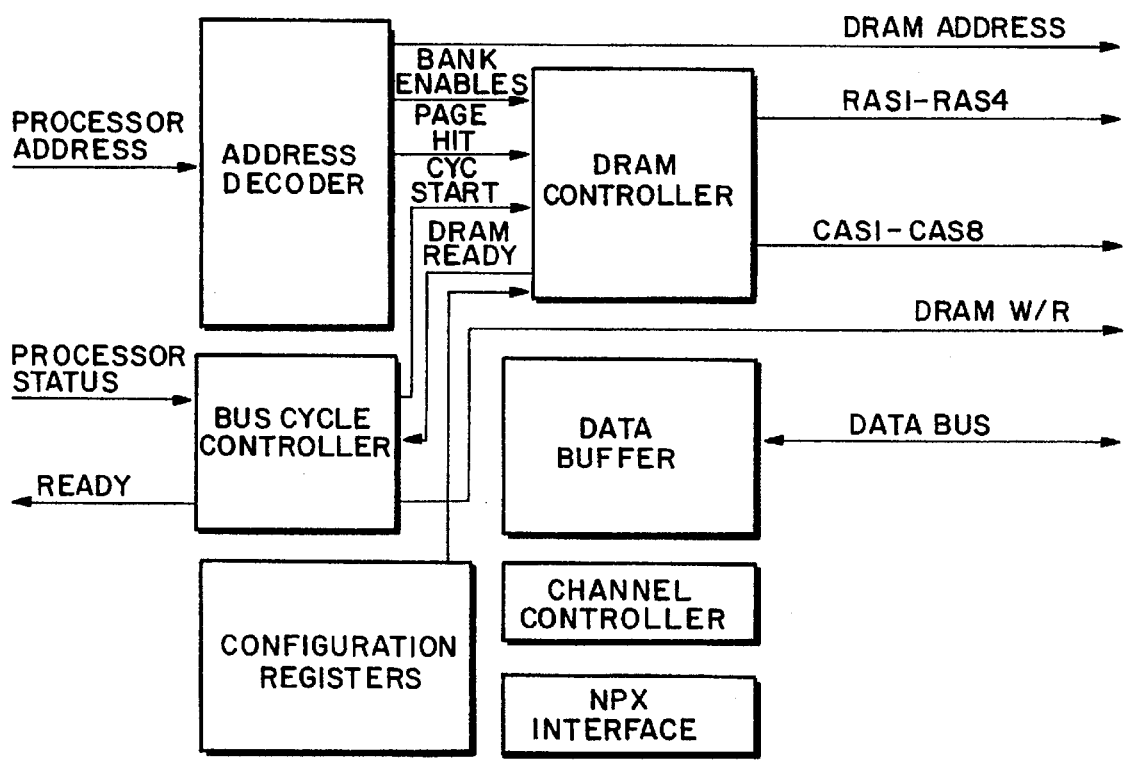
FIG. 2
FIG. 3

FIG. 6A

| | D7 | D6 | D5 | D4 | D3 | D2 | D1 | D0 |
|---|---|---|---|---|---|---|---|---|
| RAMSET | MA, RAMW– CURRENT DRIVE | | EST ART | READ ONLY | PG MODE BANK A | PG MODE BANK B | INTRLV BANK A | INTRLV BANK B |
| RASTMA | RAS TO ADDSEL | RAS TO CAS DELAY | READ ONLY | RAS PRECHARGE TIME | | RAS ACTIVE TIME | | | (A)
| CASTMA | CAS ACTIVE TIME (WRITES) | | CAS START TIME | CAS PRECHARGE TIME | | READ ONLY | CAS ACTIVE TIME (READS) | | (A)
| RASTMB | RAS TO ADDSEL | RAS TO CAS DELAY | READ ONLY | RAS PRECHARGE TIME | | RAS ACTIVE TIME | | | (B)
| CASTMB | CAS ACTIVE TIME (WRITES) | | CAS START TIME | CAS PRECHARGE TIME | | READ ONLY | CAS ACTIVE TIME (READS) | | (B)

FIG. 6B

| REGISTER | BITS | RANGE (CLK 2) |
|---|---|---|
| RASTM | 7 | 1/2–1 |
| RASTM | 6 | 1–2 |
| RASTM | 3,4 | 2–5 |
| RASTM | 2,1,0 | 2–7 |

| REGISTER | BITS | RANGE (CLK 2) |
|---|---|---|
| CASTM | 6,7 | 1–4 |
| CASTM | 5 | 1–2 |
| CASTM | 3,4 | 1–3 |
| CASTM | 1,0 | 2–5 |

N+0.5 WAIT STATE PROGRAMMABLE DRAM CONTROLLER

The present invention relates generally to a new and improved chip for use in a computer and more particularly to an improved N+0.5 wait state programmable DRAM controller for use in microprocessor system such as IBM's PC/AT which is used herein as typical.

BACKGROUND OF THE INVENTION

The present invention generally relates to a very large scale integration (VLSI) circuit as part of an electronic chip which has as its principle application improving personal computer (PC) microprocessor performance by reducing the amount of wait states incurred when accessing dynamic random access memory (DRAM) memory for both read and write accesses.

In earlier generations of PC chips sets, the range of CPU and DRAM speed was more narrow than current generations of chip sets. Chip set designers were making designs to support 80286 processors operating from 6 to 12 MHz. Those systems normally supported affordable dynamic memories with RAS (Row Address Strobe) access times of 120 or 100 ns.

Newer technologies have made available 80286 processors operating up to 25 KHz and 80386DX processors capable of 33 MHz clock rates. The DRAM performance has also improved. Some memory manufactures currently produce DRAMs with access times as low as 50 ns. These new, faster devices have segregated the chip set market between high-, mid-range- and low-end PC systems which is why the present invention incorporates extensive user programmable DRAM interface options into its design. Microprocessor systems normally allow processor clock driven wait states to be inserted within memory access cycles in integer values only (i.e. 0, 1, 2, 3, 4) in order to match performance specifications of various microprocessors, DRAM controller and DRAM device combinations. Although successful in permitting combinations of such devices with differing performance specifications to be used, the method seriously limits the ability of a system to perform to the potential capabilities of modern microprocessors.

Prior art devices permit the programming of memory addressing signals such as Row Address Strobe (RAS) and Column Address Strobe (CAS) but is limited to tying them to the memory cycle start time and to the processor clock.

The present invention is directed to overcoming the prior art limitations with a device which allows RAS and CAS to be decoupled from the exact memory cycle start time and enables signal pulse resolution twice that of the processor clock resulting in significant processor performance gains.

BRIEF SUMMARY OF THE INVENTION

More particularly, the present invention provides an N+0.5 (average) wait state programmable DRAM controller which allows consecutive DRAM accesses to average some integer number of wait states N plus 0.5 wait state (where N=0–4).

The actual average 0.5 wait state is caused by consecutive DRAM accesses which alternate between N and N+1 wait states. This half wait state average is possible when the system central processor unit measures wait states in processor clock time units which are 2 times the period of the clock which triggers RAS/CAS signals.

A processor DRAM access cycle consists of RAS and CAS asserting for a specified time and then deasserting. Because the RAS and CAS assert and deassert times are programmable in units of ½ processor clock, the situation arises where RAS and/or CAS (depending on the mode of operation) may deassert in the middle of a processor state, indicating the DRAM data transfer is complete, but the processor memory cycle must wait until the end of the processor state before it recognizes the memory cycle completion. This ½ processor state allows RAS and/or CAS precharge time to begin early via independent RAS and CAS deassert counters which then enable RAS or CAS to assert ½ processor clock earlier in the next memory cycle relative to the previous. This early assert time allows an early deassert time (relative to the previous memory cycle) which would occur on a processor clock boundary and would be 1 less wait state than the previous access. The result is an average 0.5 wait state less in two successive memory accesses.

Accordingly, a principal object of the present invention is to provide a new and improved N+0.5 wait state programmable DRAM controller for use in a microprocessor based system.

Another object of the present invention is to provide a new and improved DRAM controller which improves microprocessor performance by reducing the amount of wait states incurred when accessing DRAM memory for both read and write access.

A further object of the present invention is to provide a new and improved DRAM controller for microprocessor based systems which enables RAS and CAS to be decoupled from the exact memory cycle time and enables signal pulse resolution two times that of the processor clock.

These and still further objects as shall hereinafter appear are readily fulfilled by the present invention in a remarkably unexpected fashion as will be readily discerned from the following detailed description of an exemplary embodiment thereof especially when read in conjunction with the accompanying drawing in which like parts bear like numerals throughout the several views.

BRIEF DESCRIPTION OF THE DRAWINGS

In the drawing:

FIG. 1 is a photograph of a VLSI System Controller chip embodying the present invention as a circuit therewithin;

FIG. 2 is a table CPU/DRAM system configurations related to the operation of the present invention within the System Controller;

FIG. 3 is a block diagram of the System Controller showing the processor/DRAM interface;

FIG. 6(a) is a table of the System Controller Programmable DRAM Interface Registers providing independant control of RAS and CAS for two separate bank pairs;

FIG. 6(b) shows the programmable ranges for RAS and CAS signals in CLK2 units.

DESCRIPTION OF THE PREFERRED EMBODIMENT

Figure 4:
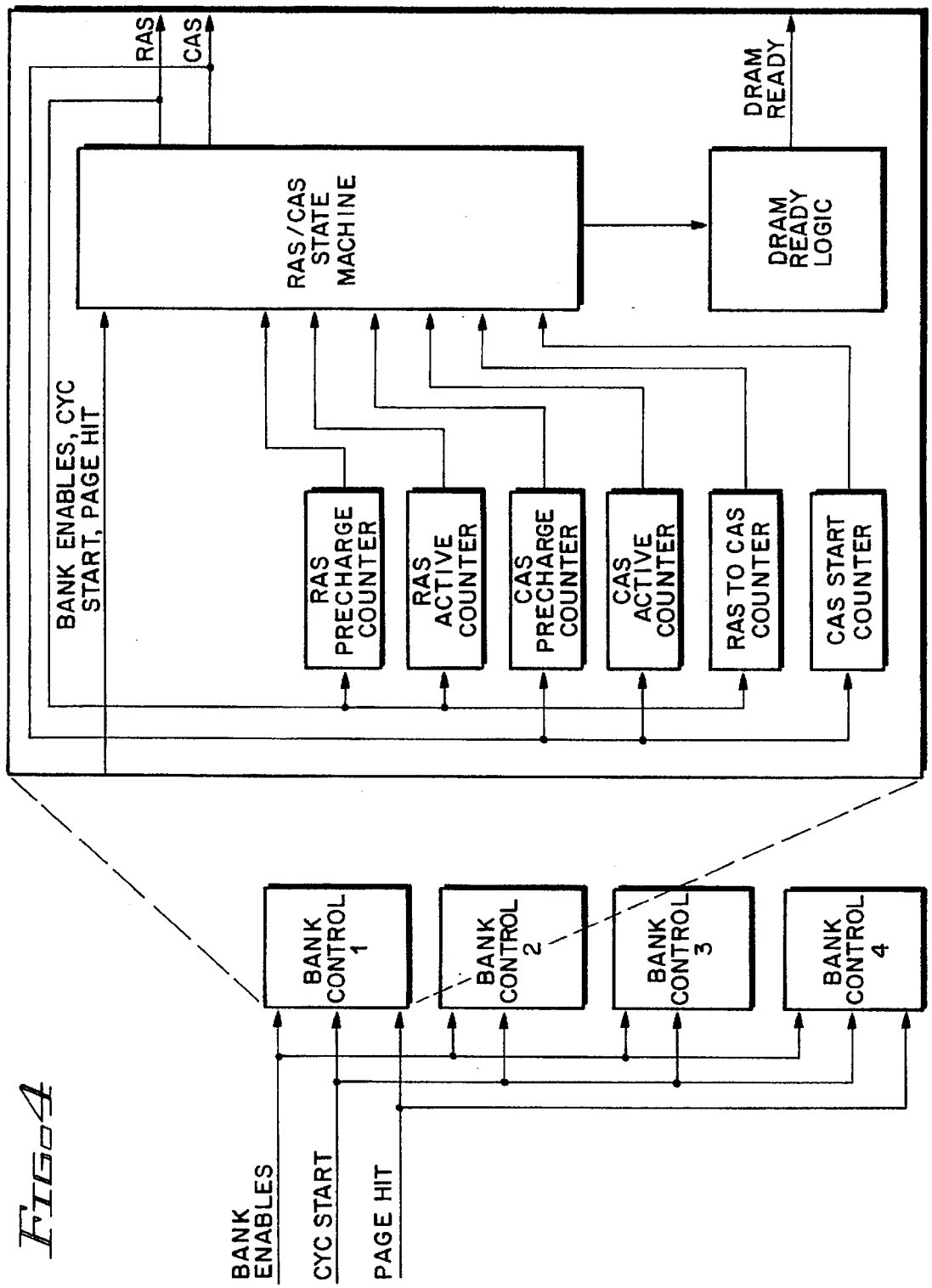
FIG. 4 is a block diagram of a DRAM controller embodying the present invention.

The DRAM controller of the present invention 20 identified by the general reference 10, comprises a circuit disposed within a VLSI system controller chip 12 such as that shown in FIG. 1. The present invention is critical to the proper functioning of the system controller chip 12 and is therefore well described relative to the chip as a whole. Around the perimeter of the system controller chip 12 are pins 13 which allow the transmission/reception of electronic signals between that chip and other chips in the PC/AT set.

FIG. 3 shows the System Controller block diagram. The memory interface blocks namely, the DRAM controller 10, the address decoder 14, and the bus cycle controller 15 are emphasized in bold blocks. The CPU addresses are decoded by the address decoder 14 to determine if the system board memory is to be accessed. The bus cycle control block 15 decodes the CPU status signals, notifying the DRAM controller 10 when to start a memory cycle. This block also delivers the write/read (W/R) signal to the DRAM.

The present invention is contained within the DRAM controller block as shown in FIG. 4. The block consists of four separate identical DRAM bank controllers 18, 19, 20 and 21. Each bank controller possesses individual counters supporting BIOS or user programmed RAS/CAS parameters which are determined according to the CPU/DRAM system configuration. Through feedback, these counters monitor pulse widths and start times of RAS and CAS completely independent from the memory cycle start (CYC START). (See FIG. 3 and FIG. 4). The counters feed the RAS/CAS state machine enabling transitions when programmed times are met.

This memory interface control is somewhat different from many personal computer memory controllers of the past. As mentioned before, the necessary range of support in the past was not as wide as the range needed for current systems. These narrow ranges enable simpler designs. Based on the system configuration, the typical programmable interface allowed RAS and CAS transitions only on predetermined edges. It was possible to program only integer wait state performance. In normal memory operation the RAS and CAS assert and deassert times were consistently the same in every cycle.

Figure 5:
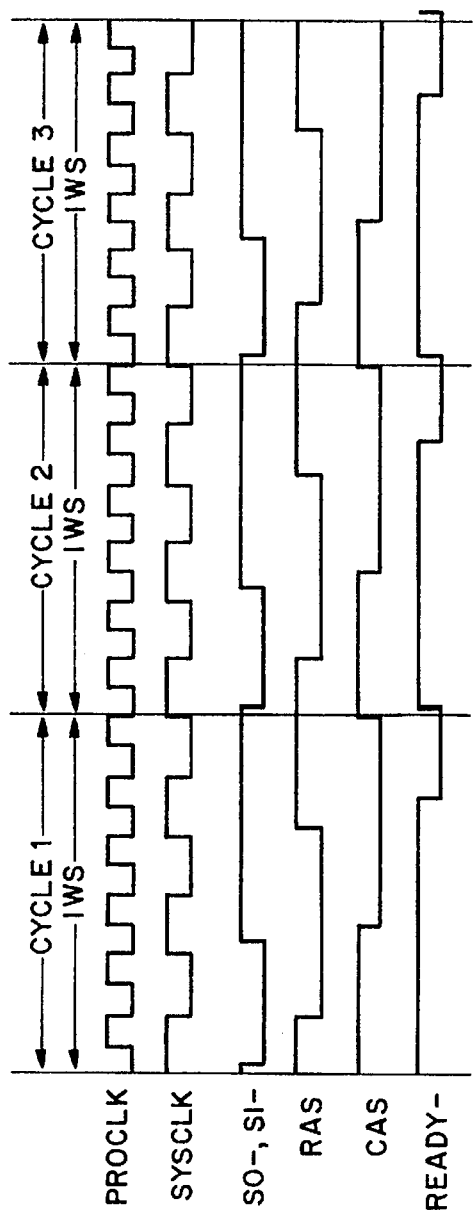
FIG. 5 is a timing diagram showing the Non-Pagemode RAS/CAS DRAM cycle having a 1 wait state memory access)

The start time for RAS/CAS was determined by incorporating several limits. One limit was imposed by CPU status decode, so that a memory request was assured before RAS/CAS activated. Another limit was the CPU address decoding. This assured time to select 1 bank in a multi-bank partitioned memory system and time to multiplex the DRAM memory address to the DRAM before latching it in with RAS or CAS. Finally, RAS/CAS start time had to be late enough to ensure the pre-charge time of the DRAM had been achieved from the previous memory cycle. Such a 1 wait state non-page-mode RAS/CAS access which supported this type of memory interface in a 80986-based 12 MHz system running 100 ns DRAMs is shown in FIG. 5.

The System Controller embodying the present invention provides a programmable interface with options to program RAS and CAS pulse widths for system configurations ranging in speed as shown in FIG. 2. This is provided for with five memory control registers denominated RAMSET 22, RASTMA 23, CASTMA 24, RASTMB 25 and CASTMB 26 as shown in FIG. 6. The RAS/CAS optional DRAM parameters are programmed through the RASTMA, RASTMB and CASTMA, CASTMB registers. This is possible because all of the RAS/CAS timing is user programmable in CLK2 time units which are one half the periods of the CPU clock (SYSCLK). The RASTM register allows programming of DRAM specifications (see FIG. 6B for ranges) such as RAS pre-charge (TRP) (23,D3–D4) and (25, D3–D4), RAS active time (TRAS). RAS active to CAS active delay time (TRCD). The CASTM register provides options for CAS pre-charge (TCP), CAS active time for read cycles (TCAS) and CAS active time for write cycles (TCAS), and a CAS start time during write cycles (TDS). This configuration provides a high granularity, especially at higher system clock rates, which can reduce the amount of dead time often incurred by hard wired wait state systems.

Figure 7:
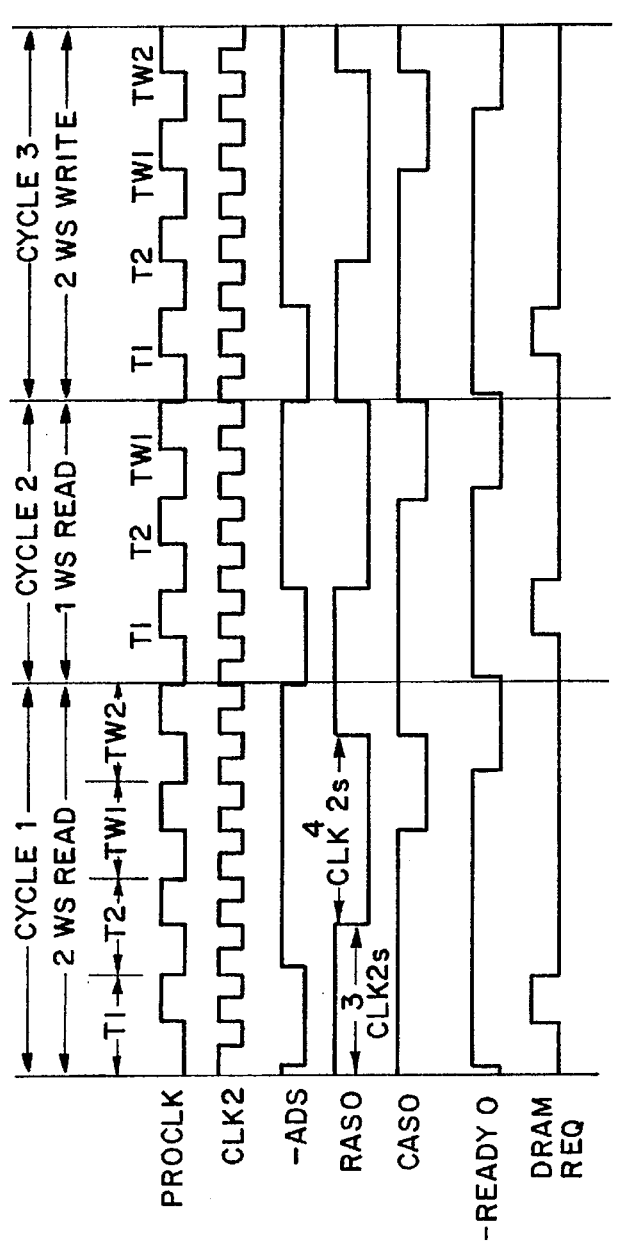
FIG. 7 is a timing diagram showing consecutive RAS/CAS memory cycles alternating between 1 and 2 wait state for a total memory access average of 1.5 wait states.

The operation of a preferred embodiment of the present invention is best understood by considering how the programming of RAS/CAS parameters is separate from the memory cycle start time as shown in FIG. 7. The analysis of this configuration was performed for a 80386SX system operating at 20 MHz, utilizing NEC's 1 Megabit, 80 ns, fast page DRAMs. All ROM shadow and memory extension is disabled and only one bank is populated, enabling RAMSET bit 2 (ESTART-) to be active. The DRAM controller is programmed for non-page-mode operation. Note that in the first memory cycle, the data transfer is completed and the system READY signal to the CPU is delivered in four SYSCLKs. RAS (28) is not able to transit active (low) until the middle of the second SYSCLK cycle (T2) because of the three CLK2 programmed RAS pre-charge limit. RAS remains active for four CLK2s to meet the DRAM access time end terminates in the middle of the fourth SYSCLK (TW2), making this memory access a total of 2 wait states. Because RAS (28) deactivated one CLK2 before the end of cycle 1, the pre-charge counter begins counting, enabling only two CLK2s into cycle 2 for RAS to transit active. The cycle start signal requesting a memory cycle is sampled at the beginning of T2. PAS is pre-charged and is able to transit active at this CLK2 sample edge. RAS remains low for the programmed four CLKs, ending at the end of CPU state TW1 resulting in a 1 wait state memory access. These accesses are able to alternate between 1 and 2 wait states for a total memory performance averaging 1.5 wait states. If RAS per-charge and the memory start limits were coupled, as in many previous DRAM controllers, TRP and TRAS limited to three and four CLK2s, respectively, the memory access performance would always be 2 wait states. The earliest start time for RAS would have to be the middle of T2 in order to ensure RAS pre-charge and valid address and status decode.

Thus a non-wait state user programmable DRAM controller is described which provides an N+0.5 average wait state system as measured by the CPU where N is an integer number.

From the foregoing, it becomes apparent that new and useful device has been herein described and illustrated which fulfills all of the aforestated objectives in a unique fashion. It is of course understood that such modifications, alterations, and adaptations as may readily occur to an artisan having the ordinary skills to which this invention pertains are intended within the spirit of the present invention which is limited only by the scope of claims appended hereto.

Accordingly, what is claimed is:

1. For use in an N+1 wait state computer system having a microprocessor for controlling memory cycle start signal, bank select signal and same page access signal and having operatively associated therewith a bus cycle controller having RAMSET, RASTMA, RASTMB, CASTMA and CASTMB registers; a system clock for generating microprocessor clock cycles; and, a plurality of DRAM memory devices operable at an average of N+one-half microprocessor wait states, said DRAM memory devices being responsive to DRAM RAS and DRAM CAS access timing signals generated by a DRAM controller operatively associated with said microprocessor and said DRAM memory devices; an improved programmable DRAM controller comprising: means to program said DRAM RAS and DRAM CAS access timing signals in units of one-half said microprocessor clock cycle to reduce said DRAM RAS and said DRAM CAS access timing from N+1 microprocessor wait states to an average of N+one-half microprocessor wait states by repetitively varying said access timing from N+1 to N wait states.

2. A programmable DRAM controller according to claim 1 in which said DRAM RAS and DRAM CAS access programs RAS and CAS times in units of one-half microprocessor clock cycle to provide said DRAM RAS and DRAM CAS access in an average of N+one-half said microprocessor wait states.

3. A programmable DRAM controller according to claim 1 in which said controller includes a plurality of DRAM bank controllers which enable said DRAM RAS and DRAM CAS access timing to occur independently of said memory cycle start signal, bank select signal and same page access signal.

4. A programmable DRAM controller according to claim 1 in which said DRAM controller contains five memory control registers each being programmable through a different one of said RAMSET, RASTMA, RASTMB, CASTMA and CASTMB registers.

5. A programmable DRAM controller according to claim 2 in which said DRAM controller includes a plurality of DRAM bank controllers which enable said RAS and CAS access timing to occur independently of said memory cycle start signal, bank select signal and same page access signal.

6. A programmable DRAM controller according to claim 2 in which said controller contains five memory control registers each being programmable through a different one of said RAMSET, RASTMA, RASTMB, CASTMA and CASTMB registers.

7. A programmable DRAM controller according to claim 5 in which said controller contains five memory control registers each being programmable through a different one of said RAMSET, RASTMA, RASTMB, CASTMA and CASTMB registers.

* * * * *